(12) United States Patent
Su et al.

(10) Patent No.: US 10,131,000 B2
(45) Date of Patent: Nov. 20, 2018

(54) OBJECT BURR PROCESSING MACHINE

(71) Applicant: FACTORY AUTOMATION TECHNOLOGY CO., LTD., Chiayi County (TW)

(72) Inventors: Po Cheng Su, Chiayi County (TW); Chen Hsiang Lin, Chiayi County (TW); Hsin Hong Hou, Chiayi County (TW)

(73) Assignee: FACTORY AUTOMATION TECHNOLOGY CO., LTD., Chiayi (TW)

( * ) Notice: Subject to any disclaimer, the term of this patent is extended or adjusted under 35 U.S.C. 154(b) by 48 days.

(21) Appl. No.: 15/343,337

(22) Filed: Nov. 4, 2016

(65) Prior Publication Data

US 2017/0129023 A1    May 11, 2017

(30) Foreign Application Priority Data

Nov. 5, 2015   (TW) .............................. 104217800 U

(51) Int. Cl.
  *B23C 3/12*    (2006.01)
  *G05B 19/402*    (2006.01)

(52) U.S. Cl.
  CPC .............. *B23C 3/12* (2013.01); *G05B 19/402* (2013.01); *B23C 2215/085* (2013.01);
  (Continued)

(58) Field of Classification Search
  CPC . B23C 3/12; B23C 2215/085; B23C 2220/20; Y10T 409/304144; Y10T 409/307224; Y10T 409/307336
  (Continued)

(56) References Cited

U.S. PATENT DOCUMENTS

| 4,590,578 | A | * | 5/1986 | Barto, Jr. | ................. B21J 15/10 |
| | | | | | 318/632 |
| 4,836,722 | A | * | 6/1989 | Kurita | ...................... B23Q 1/34 |
| | | | | | 409/100 |

(Continued)

FOREIGN PATENT DOCUMENTS

| DE | 3432773 A1 * | 1/1985 | ............... B23C 3/12 |
| DE | 10259215 A1 * | 7/2004 | ........... B23Q 1/5406 |

(Continued)

*Primary Examiner* — Daniel Howell
(74) *Attorney, Agent, or Firm* — Raymond Y. Chan; David and Raymond Patent Firm

(57) ABSTRACT

An object burr processing machine for trimming object burr, comprises a machine base, a positioning seat erected on the machine base, a processing arm provided on the positioning seat, an object stage coupled with the machine base for placing object, and control device. The control device comprises an object sensing unit, a processing path setting unit, and a process control unit. The object sensing unit is able to sense the shape of the object. The processing path setting unit is able to define a processing path based on the shape of the object. The process control unit communicates and links to the processing arm, the object stage, the object sensing unit, and the processing path setting unit. During the burr trimming process, the process control unit can use the established processing path to control other devices to conduct the burr trimming process to the object, which greatly increases the convenience and efficiency of the processing.

9 Claims, 7 Drawing Sheets

(52) U.S. Cl.
 CPC .............. *B23C 2220/20* (2013.01); *G05B 2219/42249* (2013.01); *Y10T 409/304144* (2015.01)

(58) Field of Classification Search
 USPC .................................. 700/173, 189, 190, 192
 See application file for complete search history.

(56) References Cited

U.S. PATENT DOCUMENTS

| | | | | |
|---|---|---|---|---|
| 5,909,988 A * | 6/1999 | Hoppe | ............... | B23B 31/261 408/89 |
| 6,219,918 B1 * | 4/2001 | Wieland | ............... | B23P 23/00 29/27 C |
| 6,836,702 B1 * | 12/2004 | Brogårdh | ............... | B23K 26/04 318/568.1 |
| 7,704,023 B2 * | 4/2010 | Cheung | ............... | B26D 1/0006 409/138 |
| 9,248,515 B2 * | 2/2016 | Chou | ............... | B23B 31/185 |
| 9,381,580 B2 * | 7/2016 | Yang | ............... | B23C 3/12 |
| 2009/0160388 A1 * | 6/2009 | Zagromski | ............... | B23Q 5/58 318/570 |
| 2013/0269189 A1 * | 10/2013 | Keller | ............... | B23C 3/18 29/889.7 |
| 2014/0150243 A1 * | 6/2014 | Mamczur | ............... | B23B 5/28 29/527.4 |
| 2015/0328773 A1 * | 11/2015 | Boca | ............... | B25J 9/1664 700/189 |

FOREIGN PATENT DOCUMENTS

| | | | | |
|---|---|---|---|---|
| DE | 102009020771 A1 * | 11/2010 | ............... | B23C 3/12 |
| JP | 01109041 A * | 4/1989 | | |
| JP | 02024031 A * | 1/1990 | ........... | B23Q 1/5412 |
| JP | 04152011 A * | 5/1992 | | |

* cited by examiner

OBJECT BURR PROCESSING MACHINE

NOTICE OF COPYRIGHT

A portion of the disclosure of this patent document contains material which is subject to copyright protection. The copyright owner has no objection to any reproduction by anyone of the patent disclosure, as it appears in the United States Patent and Trademark Office patent files or records, but otherwise reserves all copyright rights whatsoever.

BACKGROUND OF THE PRESENT INVENTION

Field of Invention

The present invention relates to an object burr processing machine, in particular, to an object burr processing machine that senses the shape of an object and defines processing path for the object based on the shape of the object.

Description of Related Arts

With the advance of science and technology, the basic requirements and design highlights of a processing machine have to not only include higher processing efficiency, but also include better accuracy and convenience of the processing. Based on the current technology, in order to achieve the above efficiency, machining accuracy, and convenience enhancements, the mechanical structure of a processing machine has to be well integrated with the control system. Nonetheless, object burr processing machines in conventional technology can just achieve basic burr trimming and have a certain processing efficiency at best. The machining accuracy and convenience enhancements are yet to be done by the industry in the future because the present focus of the technology is still on the overall structural design of a processing machine, rather than inducing the control system that enhances the machining accuracy and convenience, in which Taiwan Pat. No. M498074: "Wheel rim burrs remover dead zone milling structure" and Taiwan Pat. No. M494075: "Burr and surface treatment machine" are two of the best example. In order to improve on the above disadvantages, the technology of the present invention comes.

SUMMARY OF THE PRESENT INVENTION

Accordingly, an object of the present invention is to provide an object burr processing machine that has machining accuracy and convenience.

Correspondingly, an object burr processing machine according to the present invention for trimming object burr comprises a machine base, a positioning seat erected on the machine base, a processing arm provided on the positioning seat, an object stage coupled with the machine base for placing object, and control device. The object stage pivotally arranges the turning angle. The processing arm is allowed to trim the burr of the object placed on the object stage. The control device comprises an object sensing unit, a processing path setting unit, and a process control unit, wherein the object sensing unit is provided to sense the shape of the object, wherein the processing path setting unit defines a processing path based on the shape of the object, wherein the process control unit communicates with all of the processing arm, the object stage, the object sensing unit, and the processing path setting unit, so as to not only control the turning of the object stage, but also control the processing arm to trim the burr of the object according to the processing path. During the burr trimming process, the trimming completely follows the path that was calculated based on the shape of the actual object, which greatly enhances the accuracy of the process. Besides, after an object of a type establishes a processing path, as long as the object sensing unit detects the same object shape, the process control unit can use the established processing path to control other devices to conduct the burr trimming process to the object, which greatly increases the convenience and efficiency of the processing.

Still further objects and advantages will become apparent from a consideration of the ensuing description and drawings.

These and other objectives, features, and advantages of the present invention will become apparent from the following detailed description, the accompanying drawings, and the appended claims.

DETAILED DESCRIPTION OF THE PREFERRED EMBODIMENT

Figure 1:
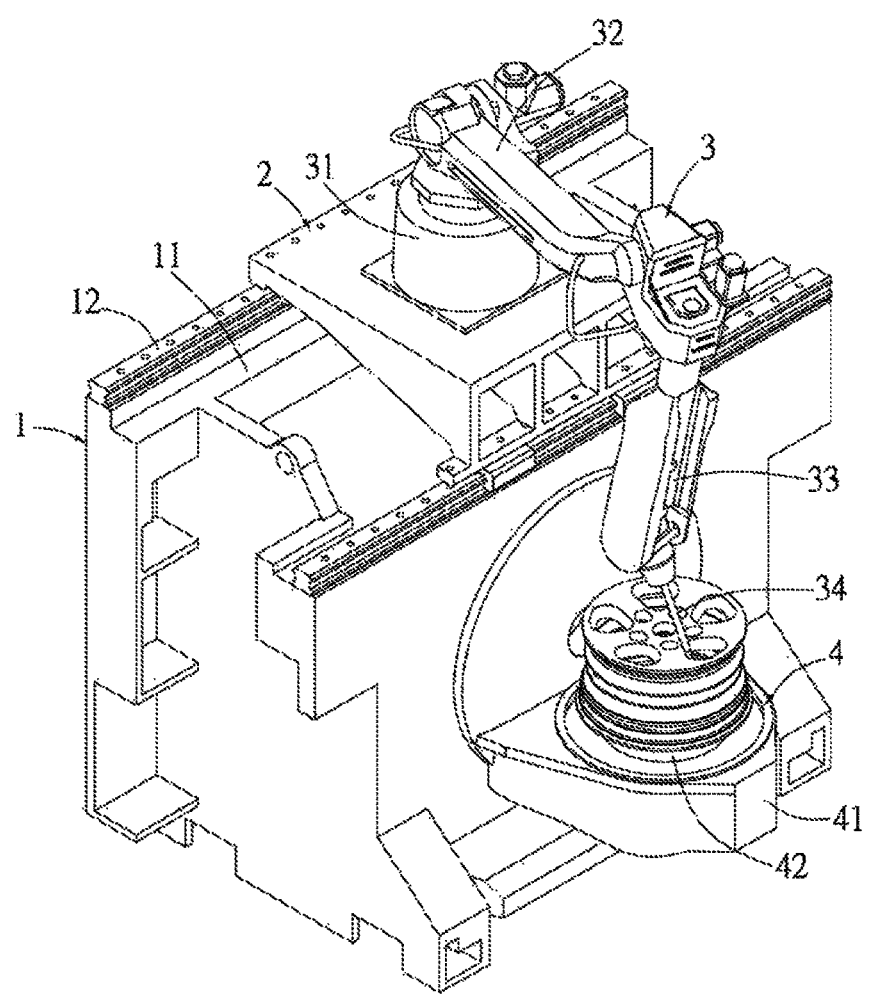
FIG. 1 is a 3D perspective view of the object burr processing machine according to a preferred embodiment of the present invention.
Figure 2:
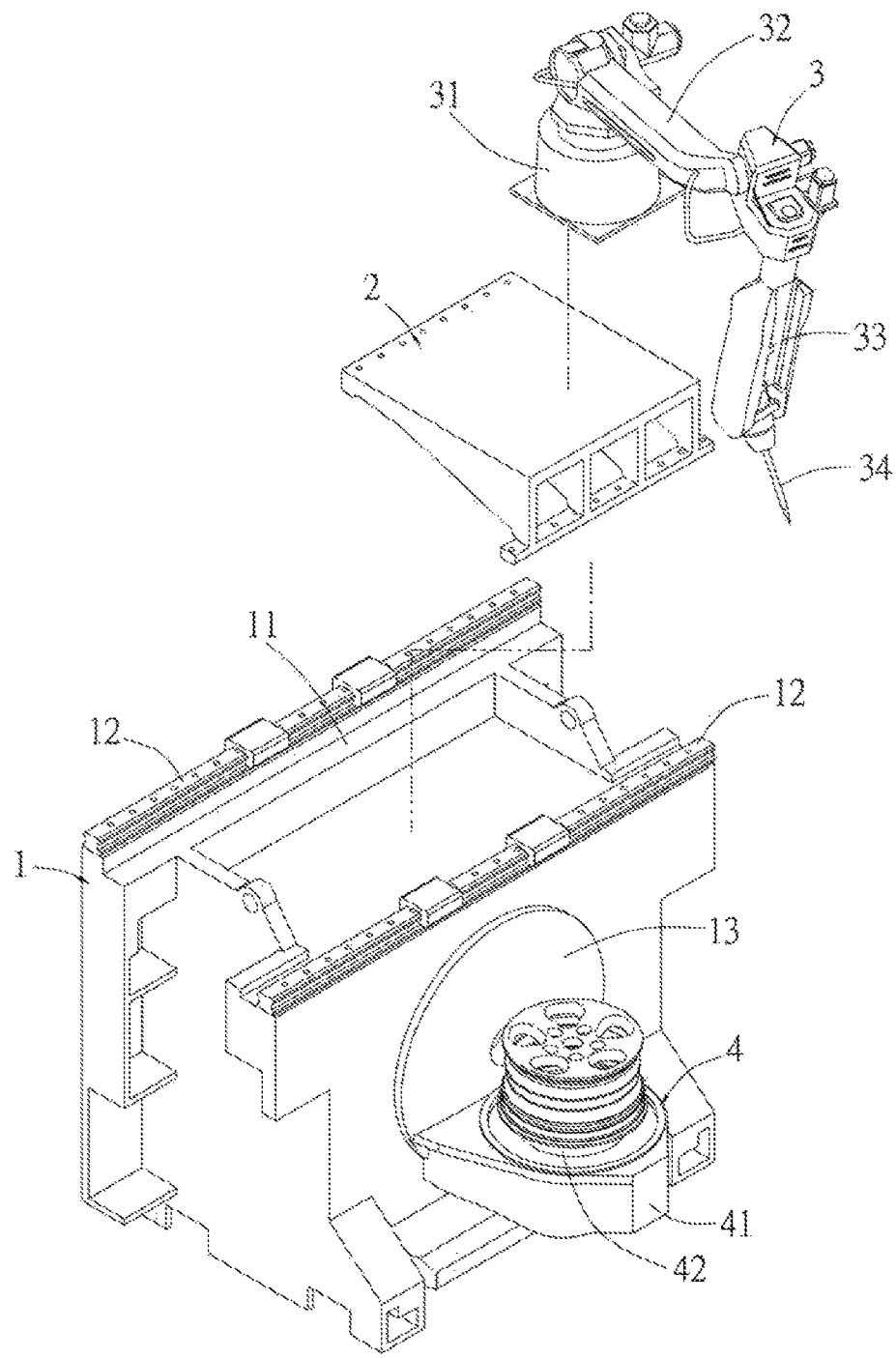
FIG. 2 is a partial exploded view of the object burr processing machine according to the above preferred embodiment of the present invention.
Figure 3:
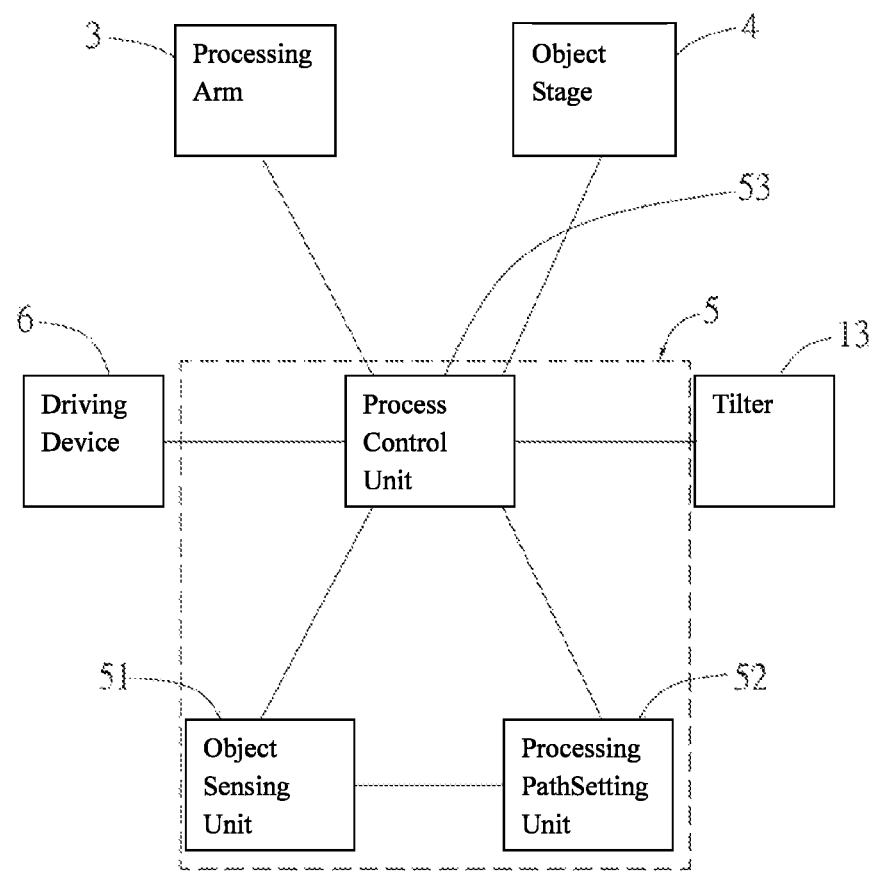
FIG. 3 is a control block diagram of the object burr processing machine according to the above preferred embodiment of the present invention.

Referring to FIGS. 1-3, the object burr processing machine according to a preferred embodiment of the present invention for conducting object burr trimming process comprises a machine base 1, a positioning seat 2, a processing arm 3, an object stage 4, and a control device 5.

The machine base 1 comprises a main body 11, two parallel linear guides 12 arranged above the main body 11, and a tilter 13 provided on a side of the main body 11. The tilter 13 can turn its angle based on the needs.

The positioning seat 2 is slidably mounted on the linear guides 12 and can be linked and synchronized with a driving device 6 (not shown in FIGS. 1 and 2) to slide on the linear guide 12.

The processing arm 3 is secured on the positioning seat 2 and, in this embodiment, can be a robot arm that can turn in a multispindle or multi-axial manner. The processing arm 3 is orderly composed of a swivel 31, a cantilever 32, a plumbing arm 33, and a cutter 34 connected to one another. The operations of each part can be controlled by programs, which would not be described or repeated here.

The object stage 4 is erected on the tilter 13 and is able to turn and swing with the tilter 13 and to allow an object, such as a wheel rim, for example in the present embodiment, to be erected or fixed thereon. The object stage 4 is composed of a base seat 41 and a turnplate 42 for erecting an object, wherein the base seat 41 is connected on the tilter 13 and the turnplate 42 is rotatable relatively to the base seat 41. Therefore, the rotation and turning of the tilter 13 and the turnplate 42 can turn the workpiece to the required angle for process.

Figure 4:
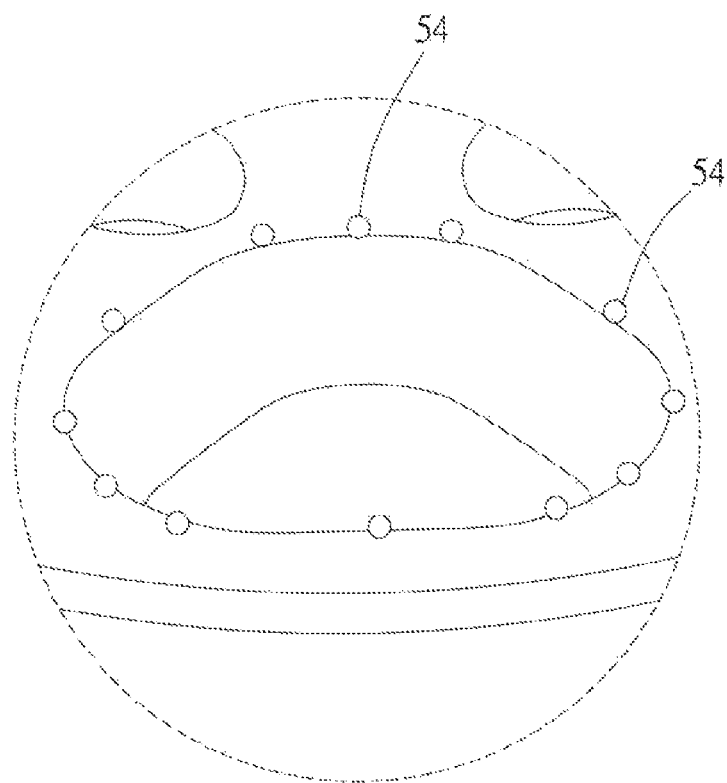
FIG. 4 is a perspective view of the processing marks of the object burr processing machine according to the above preferred embodiment of the present invention.
Figure 5:
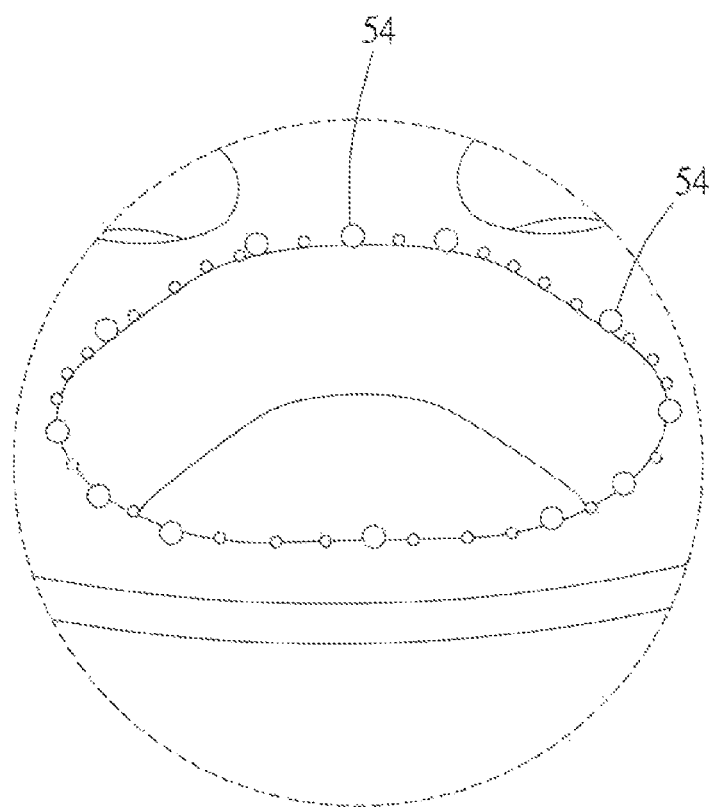
FIG. 5 is a perspective view of the processing path setup of the object burr processing machine according to the above preferred embodiment of the present invention.
Figure 6:
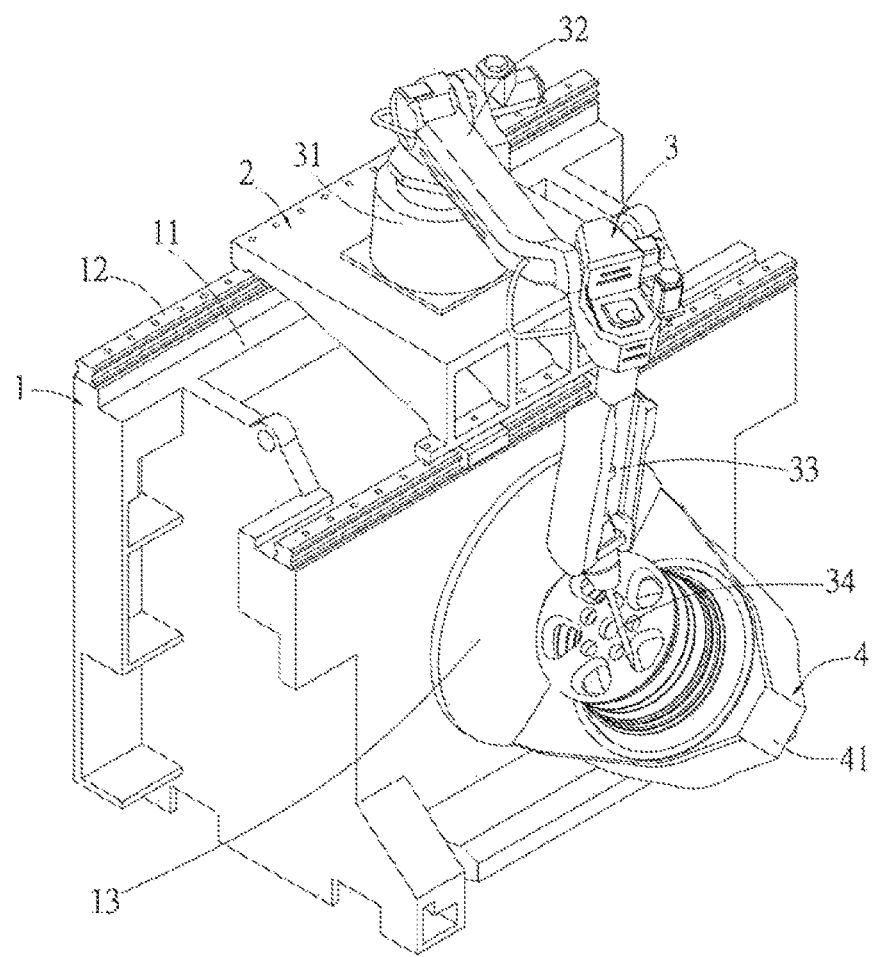
FIG. 6 is a perspective view of an operation of the object burr processing machine according to the above preferred embodiment of the present invention.

The control device 5 comprises an object sensing unit 51, a processing path setting unit 52, and a process control unit 53. The object sensing unit 51 can utilize camera or light projection to detect the shape of the object. The processing path setting unit 52 is connected and communicated with the object sensing unit 51, so a worker can pre-mark the processing marks 54, as FIG. 4 illustrated, according to the object shape detected by the object sensing unit 51. Then, the processing marks 54 can be applied for calculating and defining the processing path, as FIG. 5 illustrated. The process control unit 53 is connected with the driving device 6, the tilter 13, the processing arm 3, the object stage 4, the object sensing unit 51, and the processing path setting unit 52 at the same time, so as to not only control the object stage 4 and the tilter 13 to turn, as FIG. 6 illustrated, but also control the processing arm 3 to conduct trimming process to the burr of the object according to the processing path.

When using the present invention for trimming the object burr, it is firstly to have the object sensing unit 51 sense the shape of the object fixed on the object stage 4, so as to completely record the actual shape of the object. Then, the user can use the processing path setting unit 52 to set a plurality of processing mark 54 on the shape of the object and calculate and define the processing path. Next, it is to have the process control unit 53 control the driving device 6, the tilter 13, the object stage 4 and the processing arm 3 to act, so as to trim the burr for the object.

When the object burr processing machine of the present invention is conducting the burr trimming process, it conducts the process completely according to the path calculated based on the actual shape of the object, which greatly increases the accuracy of the processing. Besides, after the processing path has been established for an object of a type, as long as the object sensing unit 51 detects the same object shape, the process control unit 53 can use the established processing path to control other devices or mechanisms to conduct the burr trimming process to the object, which greatly increases the convenience and efficiency of the processing. Especially, the process results will be even better if a multispindle processing arm 3 is used.

Figure 7:
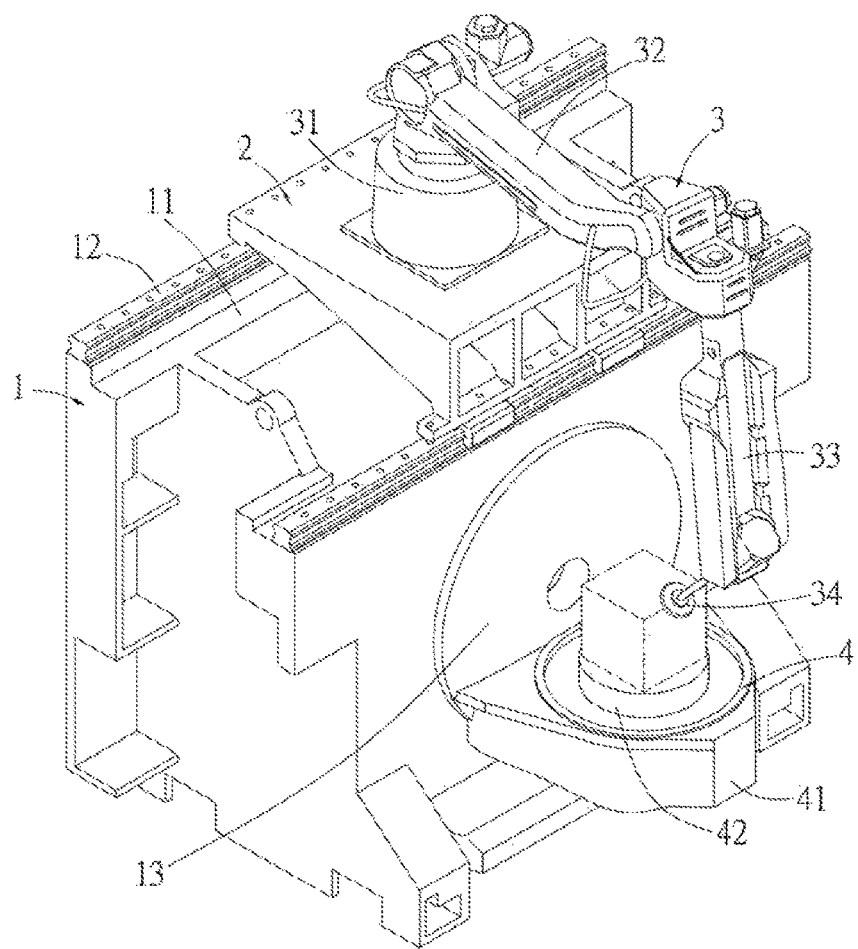
FIG. 7 is another perspective view of the object burr processing machine according to a preferred embodiment of the present invention.

It is worth to mention that the present invention can not only process wheel rim, but also other objects, as FIG. 7 illustrated. There can be different cutters 34 adapted for different objects and various types of burr. Because the processing arm 3 can act in a multispindle manner and be controlled by the control device 5 that follows the processing path, the processing machine can have better flexibility and be capable of finishing burr trimming process for objects of various shapes.

One skilled in the art will understand that the embodiment of the present invention as shown in the drawings and described above is exemplary only and not intended to be limiting.

It will thus be seen that the objects of the present invention have been fully and effectively accomplished. The embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. An object burr processing machine for trimming burr of an object, comprising:
    a machine base;
    a positioning seat movably provided on said machine base;
    a processing arm provided rotatablely on said positioning seat;
    an object stage coupled with said machine base for placing the object thereon; and
    a control device comprising an object sensing unit, a processing path setting unit, and a process control unit, wherein said processing arm is configured to trim the burr of the object placed on said object stage, said object sensing unit is provided to sense the shape of the object, said processing path setting unit is capable of defining a processing path based on the shape of the object, wherein said process control unit is communicated with said processing arm, said object stage, said object sensing unit, and said processing path setting unit respectively, so as to control the turning of said object stage and control said processing arm to trim the burr of the object according to said processing path.

2. The object burr processing machine, as recited in claim 1, wherein said processing path setting unit is configured to enable a user to set a plurality of processing marks on the shape of the object by said processing path setting unit, wherein said processing path is calculated and defined by said processing path setting unit based on said processing mark.

3. The object burr processing machine, as recited in claim 1, wherein said process control unit is configured to trim the burr of a homogeneous object by using said processing path, if said homogeneous object has the same shape as the object.

4. The object burr processing machine, as recited in claim 2, wherein said process control unit is configured to trim the burr of a homogeneous object by using said processing path, if said homogeneous object has the same shape as the object.

5. The object burr processing machine, as recited in claim 1, wherein said processing arm is a robot arm, wherein said robot arm is capable of turning in a multi-axial manner.

6. The object burr processing machine, as recited in claim 2, wherein said processing arm is a robot arm, wherein said robot arm is capable of turning in a multi-axial manner.

7. The object burr processing machine, as recited in claim 1, wherein said processing arm comprises a swivel rotatablely provided on said positioning seat, a cantilever extended from said swivel, a plumbing arm extended from said cantilever and a cutter provided with said plumbing arm.

8. The object burr processing machine, as recited in claim 2, wherein said processing arm comprises a swivel rotatablely provided on said positioning seat, a cantilever extended from said swivel, a plumbing arm extended from said cantilever and a cutter provided with said plumbing arm.

9. The object burr processing machine, as recited in claim 3, wherein said processing arm comprises a swivel rotatablely provided on said positioning seat, a cantilever extended from said swivel, a plumbing arm extended from said cantilever and a cutter provided with said plumbing arm.

* * * * *